(12) United States Patent
Soja et al.

(10) Patent No.: US 9,830,479 B2
(45) Date of Patent: Nov. 28, 2017

(54) KEY STORAGE AND REVOCATION IN A SECURE MEMORY SYSTEM

(71) Applicant: Freescale Semiconductor, Inc., Austin, TX (US)

(72) Inventors: Richard Soja, Austin, TX (US); Nancy H. Amedeo, Austin, TX (US); Timothy J. Strauss, Granger, IN (US)

(73) Assignee: NXP USA, Inc., Austin, TX (US)

( * ) Notice: Subject to any disclaimer, the term of this patent is extended or adjusted under 35 U.S.C. 154(b) by 221 days.

(21) Appl. No.: 14/487,560

(22) Filed: Sep. 16, 2014

(65) Prior Publication Data

US 2016/0078251 A1 Mar. 17, 2016

(51) Int. Cl.
| | |
|---|---|
| G06F 21/72 | (2013.01) |
| G06F 21/82 | (2013.01) |
| G06F 21/44 | (2013.01) |
| H04L 9/08 | (2006.01) |
| H04L 9/32 | (2006.01) |

(52) U.S. Cl.
CPC .............. *G06F 21/72* (2013.01); *G06F 21/44* (2013.01); *G06F 21/82* (2013.01); *H04L 9/0891* (2013.01); *H04L 9/3226* (2013.01)

(58) Field of Classification Search
None
See application file for complete search history.

(56) References Cited

U.S. PATENT DOCUMENTS

| | | | |
|---|---|---|---|
| 4,941,176 A | 7/1990 | Matyas et al. | |
| 7,370,202 B2 | 5/2008 | Appenzeller et al. | |
| 8,014,530 B2 | 9/2011 | Brickell et al. | |
| 8,175,276 B2 | 5/2012 | Tkacik et al. | |
| 8,259,947 B2 | 9/2012 | Rose et al. | |
| 8,380,918 B2 | 2/2013 | Soja et al. | |
| 8,572,408 B2 * | 10/2013 | Candelore .............. | H04N 7/165 713/193 |
| 8,762,736 B1 * | 6/2014 | Goldwasser ............ | H04L 9/003 235/375 |
| 2004/0107349 A1 * | 6/2004 | Sasselli ................. | H04L 9/0891 713/176 |
| 2007/0033419 A1 * | 2/2007 | Kocher ................... | G06F 21/10 713/193 |
| 2007/0223706 A1 | 9/2007 | Gantman et al. | |
| 2008/0189557 A1 * | 8/2008 | Pipitone ................. | G06F 21/79 713/193 |

(Continued)

OTHER PUBLICATIONS

Ziolkowski, R., "i.MX Applications Processor Trust Architecture," Platform Security Architect MCU Systems and Architecture Team, Sep. 2013, 52 pages.

*Primary Examiner* — Trang Doan

(57) ABSTRACT

A technique for providing access to a first storage structure of a system includes exposing a first key of a plurality of first keys stored in a second storage structure in response to a select code based on a plurality of corresponding select records stored in one-time programmable storage elements of the second memory structure. The technique includes providing the first key as a current first key of a memory access controller. Only one of the plurality of first keys stored in the second storage structure may be exposed at a time and other first keys of the plurality of first keys stored in the second storage structure are inaccessible from the second storage structure at the time.

15 Claims, 6 Drawing Sheets

(56) References Cited

U.S. PATENT DOCUMENTS

| | | | |
|---|---|---|---|
| 2008/0267410 A1* | 10/2008 | Dellow | H04L 9/3247 380/278 |
| 2009/0019275 A1* | 1/2009 | Park | G06F 21/575 713/2 |
| 2009/0113155 A1* | 4/2009 | Beals | G06F 12/1466 711/164 |
| 2012/0069995 A1* | 3/2012 | Matthews, Jr. | G06F 21/78 380/44 |
| 2012/0137137 A1* | 5/2012 | Brickell | G06F 21/73 713/182 |
| 2013/0238907 A1* | 9/2013 | Debout | G06F 12/1408 713/193 |
| 2014/0068246 A1 | 3/2014 | Hartley et al. | |
| 2014/0082257 A1 | 3/2014 | Scouller et al. | |
| 2014/0289488 A1* | 9/2014 | Connolly | G06F 12/1466 711/163 |
| 2016/0162669 A1* | 6/2016 | Mikhailov | G06F 21/10 713/2 |

* cited by examiner

KEY STORAGE AND REVOCATION IN A SECURE MEMORY SYSTEM

BACKGROUND

Field of the Invention

This invention relates to non-volatile memory (NVM) systems and, more particularly, to controlling access to NVM systems.

Description of the Related Art

In a typical processing application (e.g., an automotive application) a non-volatile memory (NVM) may be implemented in a stand-alone memory integrated circuit or may be embedded within other integrated circuits. The NVM is used to store information, such as boot instructions, configuration information (e.g., operational parameters or information related to security and access), and/or other types of information, that are accessed and used by a microcontroller or other processing circuit to perform various operations. To protect the confidentiality and/or integrity of that information, e.g., to prevent unauthorized software execution or attack by malware, a manufacturer may use a cryptographic key to encrypt and/or control access to the information stored in the NVM of a product. The information is inaccessible unless a user (e.g., a microcontroller or other control circuit of the associated system) provides the cryptographic key to a memory access controller. The user uses the same cryptographic key to decrypt the information and/or secure access to the information from the NVM. The cryptographic key is stored in a non-volatile, read-only permanent key register. However, if secrecy of the cryptographic key is compromised, the system is vulnerable to attack. To change the cryptographic key requires that the system be returned to the manufacturer for device replacement. Accordingly, improved techniques for controlling access to information are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A secure, low-cost technique for managing asymmetric cryptographic keys is described. The technique facilitates revocation and replacement of an asymmetric cryptographic key according to a predetermined set of private keys and corresponding public keys while the system is deployed in the target application, without recall of the product from the target application. The technique reduces the likelihood of a successful denial of service attack as compared to the likelihood for a typical non-volatile memory (NVM) system.

Figure 1:
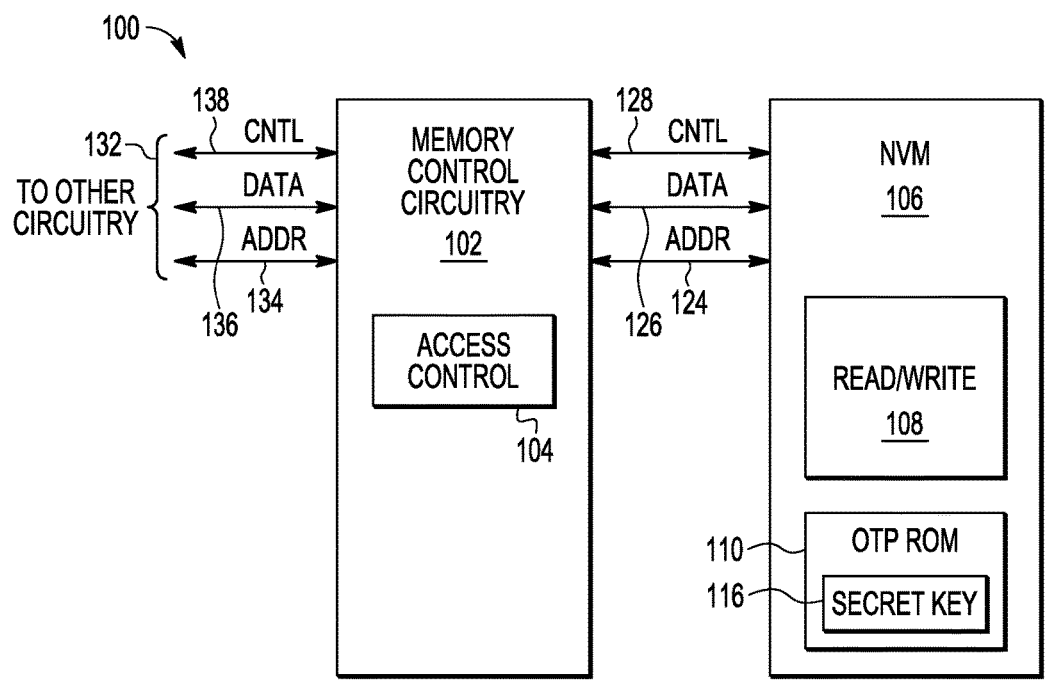
FIG. 1 illustrates a functional block diagram of an exemplary embodiment of a non-volatile memory (NVM) system using a cryptographic key for access to the NVM.

Referring to FIG. 1, NVM system 100 includes memory control circuitry 102 and access controller 104 that facilitates access to the read/write memory 108 of NVM 106. Memory control circuitry 102 communicates with NVM 106 to perform typical NVM operations using control signals (CNTL) 128, data signals (DATA) 126, and address signals (ADDR) 124. Memory control circuitry 102 communicates with other external circuitry (e.g., a microcontroller or other control or processor circuitry) using interface 132, which includes control signals (CNTL) 138, data signals (DATA) 136, and address signals (ADDR) 134. Memory control circuitry 102 also includes access control circuitry 104, which facilitates access to information stored in NVM 106.

Non-volatile memory 106 includes a read/write memory 108 that is readable and writable through read/write commands provided to NVM system 100. Read/write memory portion 108 may include flash memory, magneto-resistive random-access memory (RAM), ferroelectric RAM (F-RAM), magnetic computer storage devices, optical discs, or any other suitable non-volatile memory that can store information even when not receiving power. Non-volatile memory 106 also includes one-time programmable read-only memory 110, a portion of which may not be readable through typical read commands to NVM system 100. Shared secret key 116 is stored within one-time programmable read-only memory 110 and is loaded into a register within access controller 104 at start-up or after reset of NVM system 100.

Read/write memory portion 108 may include boot code or other configuration information that is written by the manufacturer (e.g., a supplier or other suitable entity that configures the system prior to deployment in a target application and may provide updates to the system after the deployment, referred to herein as the manufacturer), but, later, may need to be overwritten by manufacturer patches or upgrades. The contents of read/write memory portion 108 are written by the manufacturer directly (e.g., at a production facility) or indirectly, at the direction of the manufacturer, in response to instructions received using a communications link (e.g., transmission line and/or a wireless communications link) between the manufacturer and circuitry coupled to interface 132. A microcontroller or other user circuitry coupled to the memory controller accesses the memory using cryptographic techniques, e.g., by providing a shared secret key to memory controller 102. Access controller 104 allows the memory access in response to a comparison indicating that the shared secret key received with the memory request is the same as secret key 116 stored in one-time programmable read-only memory 110. If the comparison indicates that the secret key received with the memory request is different from secret key 116, the memory access is denied. The shared secret key is typically a large number or an array of randomly chosen bytes that require a large amount of storage space. However, some applications do not support secret key storage due to cost or implementation constraints. Instead, asymmetric cryptography, e.g., public-key cryptography, is used.

In general, an asymmetric key authentication mechanism uses two separate cryptographic keys that are mathematically related to each other. One of the keys is kept secret (e.g., by the manufacturer) and is referred to as a secret or private key. The other key is public and may be generated by the manufacturer and distributed to authorized users of the system. As referred to herein, users include devices, applications executing on devices, or circuitry coupled to interface 132 that access memory system 100. One of the keys (e.g., the public key) is used to decrypt ciphertext or to verify a digital signature. The other key (e.g., the private key) is used to encrypt plain text or to create a digital signature. The two keys have functions that are the inverse of each other, in contrast to symmetric cryptography, which relies on the same secret key to perform both functions. A properly generated private key is computationally infeasible to determine from its public key. In one embodiment of system 100, the creator of the information stored in read/write memory portion 108 uses the private key to encrypt information intended for storage and/or secure access to the information (e.g., boot routine). The public key used by a user in a target application does not need secret storage. Exemplary asymmetric cryptography techniques used to generate public and private keys include elliptic curve cryptography (ECC), Diffie-Hellman key exchange protocol, Digital Signature Standard, ElGamal, elliptic curve techniques, RSA encryption, Paillier cryptosystem, although other suitable techniques may be used.

If the private key of an asymmetric cryptographic system has been compromised, either intentionally or unintentionally (e.g., the private key is stolen, lost, or expired), access control circuitry 104 may allow an attacker to access the information stored in the read/write memory portion 108. For example, if the private key is stolen, an attacker may have unauthorized access to sensitive instructions or data and/or may provide new information for storage in NVM and may update the NVM with the new information to the detriment of an application using system 100. To reduce or eliminate any damage done by an attacker with a compromised private key, a technique for revoking and replacing the cryptographic keys is desired.

Figure 2:
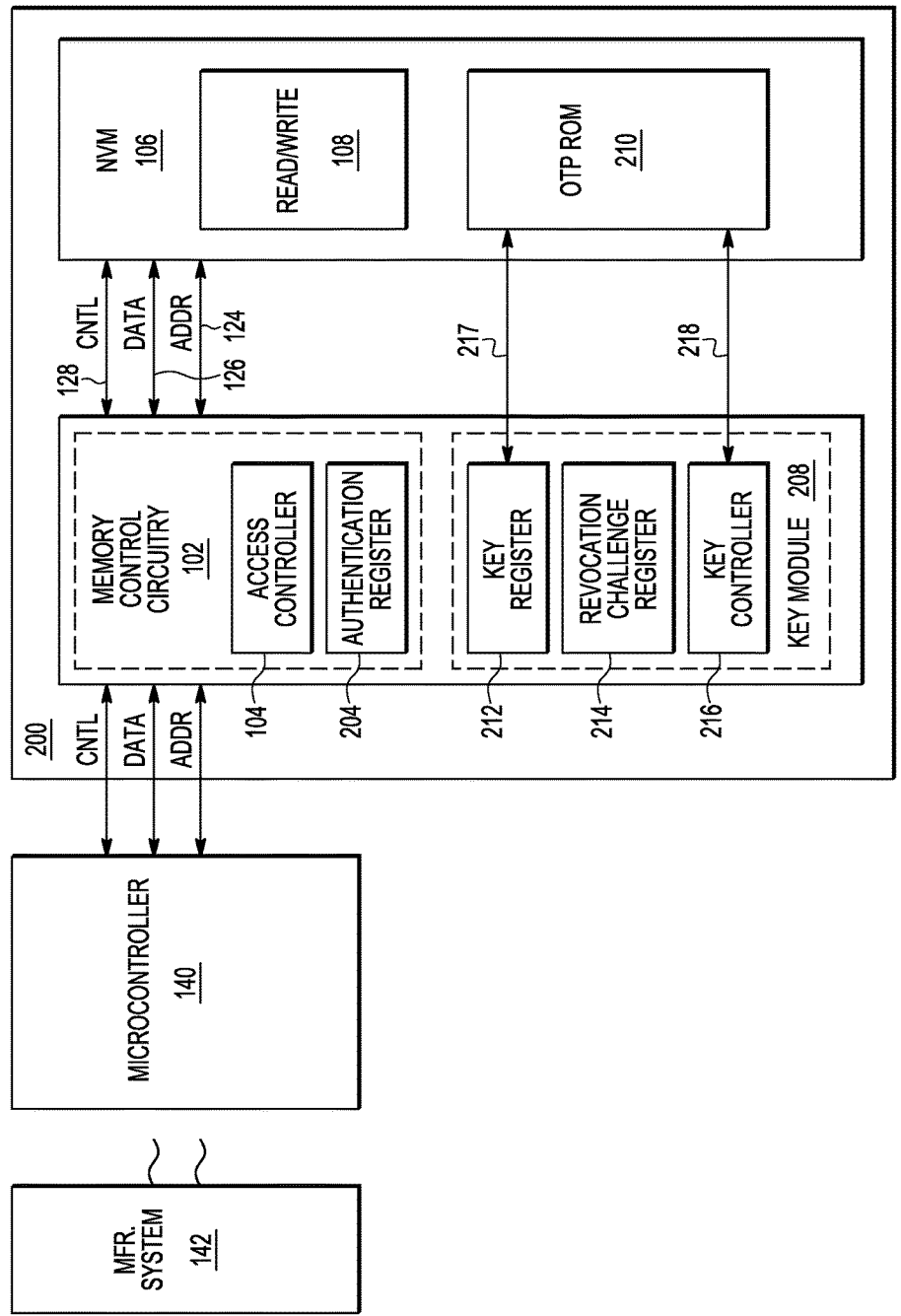
FIG. 2 illustrates a functional block diagram of an exemplary embodiment of an NVM system using a cryptographic key for access to the NVM consistent with at least one embodiment of the invention.

Referring to FIG. 2, a low-cost technique for management of asymmetric cryptographic keys that reduces a likelihood of a successful denial of service attack securely stores a plurality of public keys in a system and facilitates revocation and replacement of a current public key while the system is deployed in the target application. In at least one embodiment, the technique for management of asymmetric cryptographic keys includes key module 208, which has read and programming access to the one-time programmable read-only memory 210. One-time programmable read only memory 210 (e.g., programmable read-only memory, field programmable read-only memory (FPROM), or one-time programmable non-volatile memory (OTP NVM)) is a form of digital memory where the setting of each bit is locked by a fuse or anti-fuse. It is a type of read-only memory that is typically programmed after manufacture and once programmed, the stored data is permanent. Typical one-time programmable read-only memory has an initial state with all bits reading as '1,' and burning fuse bits during programming cause the bits to read as '0.' However, other embodiments of one-time programmable read-only memory have an initial state of all bits reading as '0,' and programming anti-fuses causes the bits to read as '1.' Blowing the fuses is an irreversible process that opens a connection, while programming an anti-fuse closes a connection. In general, a bit is programmed by applying a high-voltage pulse that is not used during normal operation across the gate and substrate of a transistor to break down the oxide between the gate and substrate. Memory control circuitry 102 communicates with one-time programmable read-only memory 210 using control signals 128, data signals 126, and address signals 124, or by a separate interface including control signals 218 and data signals 217.

Memory control circuitry 102 and NVM 106 may be included in a stand-alone system or embedded in larger a system (e.g., an engine control application). In at least one embodiment, key module 208 is incorporated into memory controller 102, but in other embodiments key module 208 is included in the NVM 106 and communicates with memory control circuitry 102 using control signals 128, data signals 126, and address signals 124 or other interface. Key module 208 includes key register 212 that stores a current public key that is exposed in one-time programmable read-only memory 210 by key controller 216 and a revocation challenge register 214 that is used to store a public key received from a user (e.g., received from microcontroller 140 or other circuitry coupled to memory control circuitry 102). In at least one embodiment, revocation challenge register 214 is a write-only storage element to memory control circuitry 102 and key register 212 is a read-only storage element to memory control circuitry 102.

Figure 3:
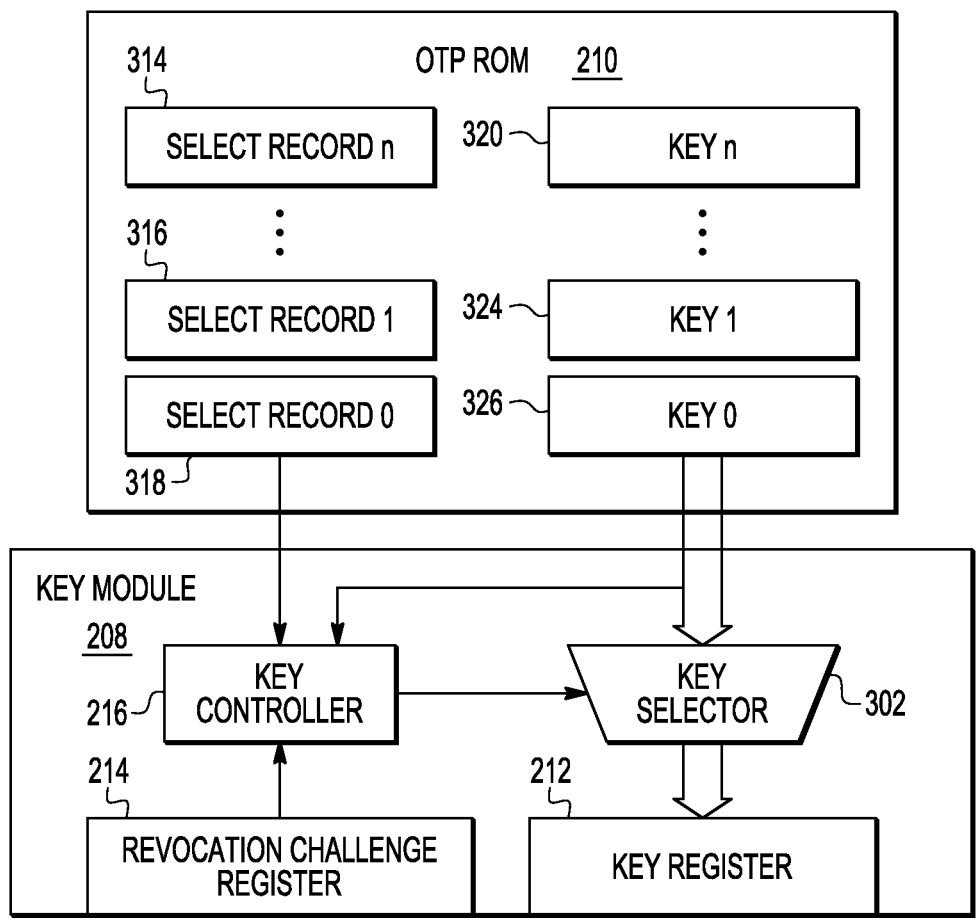
FIG. 3 illustrates a detailed functional block diagram of an exemplary embodiment of the key module and one-time programmable read-only memory of the NVM system of FIG. 2 consistent with at least one embodiment of the invention.

Referring to FIG. 3, one-time programmable read-only memory 210 includes multiple public keys that are provisioned during manufacture. The number of public keys provisioned during manufacture may be limited by the size of one-time programmable read-only memory 210. However, by provisioning those public keys in advance, a private key may be replaced without being revealed while the system is deployed in a target application and without recall of the system to the manufacturer. The entries of one-time programmable read-only memory 210 may be hashed or otherwise compressed values of the public keys to reduce storage requirements. The public key entries are read-only and are inaccessible to memory control circuitry 102 using control signals 128, data signals 126, and address signals 124. Access controller 104 receives only a current public key value from key module 208 (e.g., key register 212). The current public key may be stored in authentication register 204 and/or in random access memory of microcontroller 140 for use in authenticating memory accesses by access controller 104. Each of the public keys (e.g., key 0, key1, . . . , keyn) stored in one-time programmable memory 210 (e.g., locations 320, 324, and 326) corresponds to a separate private key that is only available to the manufacturer. At any particular time, key module 208 exposes only one of the n+1 public keys stored in one-time programmable memory 210 to memory control circuitry 102, i.e., memory controller 102 can read only the exposed public key, which is stored in n-bit key register 212 in an embodiment of key module 208. Prior current public keys and any remaining public keys are inaccessible to memory control circuitry 102 from one-time programmable read-only memory 210.

In an embodiment of key module 208, selection of the current public key to be stored in key register 212 is monotonic, i.e., only a next key in the sequence of keys is selected and older keys are not reselected. In at least one embodiment, one-time programmable read-only memory 210 includes n+1 public keys (e.g., public key 0, public key 1, . . . , public key n) that are associated with corresponding select records (e.g., select record 0, select record 1, . . . , select record n). In an embodiment that stores compressed public keys are stored in one-time programmable read-only memory 210, key module 208 includes a decompressor and key register 212 is p-bits wide. The decompressor decompresses m-bits of the selected key to a p-bit public key value that may be stored in key register 212, where m<p. In at least one embodiment where hashed public keys are stored in one-time programmable read-only memory 210, key module 208 includes a hash table and associated control circuitry and key register 212 is p-bits wide. The hash table and associated control circuitry of key selector 302 recover a p-bit public key from an m-bit hash of the public key and store the p-bit public key in key register 212.

Although the public keys are provisioned during manufacture (i.e., the one-time programmable key memory elements 320, 324, and 326 are programmed during manufacture and cannot be further changed), the manufacturer does not program at least some of select records 314, 316, and 318. Those unprogrammed select records are programmable by key module 208 in response to an indication to expose a next public key. The select records are one-time programmable elements that are used to generate a select code. The select code controls key selector circuit 302 that provides only one of the public keys for storage in key register 212. For example, the select records may be used to form a code that is used by key selector circuit 302 to select the next current public key for storage in key register 212. Each of the select records may be one bit wide and key module 208 generates the select code that may be a thermometer code of the concatenated bits. Although key controller 216 may have unrestricted access to read values in one-time programmable read-only memory 210, key selector 302 provides only one public key to key register 212 in response to the select code, thereby blocking access of the memory control circuitry 102 and microcontroller 140 to all other public keys stored in one-time programmable read-only memory 210.

Referring back to FIG. 2, a manufacturer (e.g., manufacturer system 142) may learn that a current private key has been compromised and decides to replace the current private key and current public key with a new private key and a new public key. Although NVM system 200 may use trivial revocation and selection techniques, (e.g., the public key is updated in response to an indication or request received from a user), in at least one embodiment, NVM system 200 implements a non-trivial technique to update the current public key with a next public key. The non-trivial technique reduces the likelihood of a successful denial of service attack resulting in the NVM no longer being accessible that is caused by the remaining public keys being quickly exposed and revoked until none remain and/or a user or attacker changing the public key to break correspondence with the current private key in use. Accordingly, a key revocation technique includes challenging the key revocation with a next public key in one-time programmable read-only memory 210. If the key revocation challenge is successful (e.g., a comparison of a next public key and a public key received with a memory access indicates equality), then the current public key is revoked and the next public key is made permanently available to memory control circuitry 102. For example, the next public key is exposed to memory control circuitry 102, e.g., by being loaded into key register 212, authentication register 204, and/or RAM of microcontroller 140. If the key revocation challenge is unsuccessful (e.g., a comparison of the next public key and a public key received with a memory access indicates inequality), then the current public key is not revoked and the next public key is not exposed to memory control circuitry 102 in response to that challenge.

Figure 4:
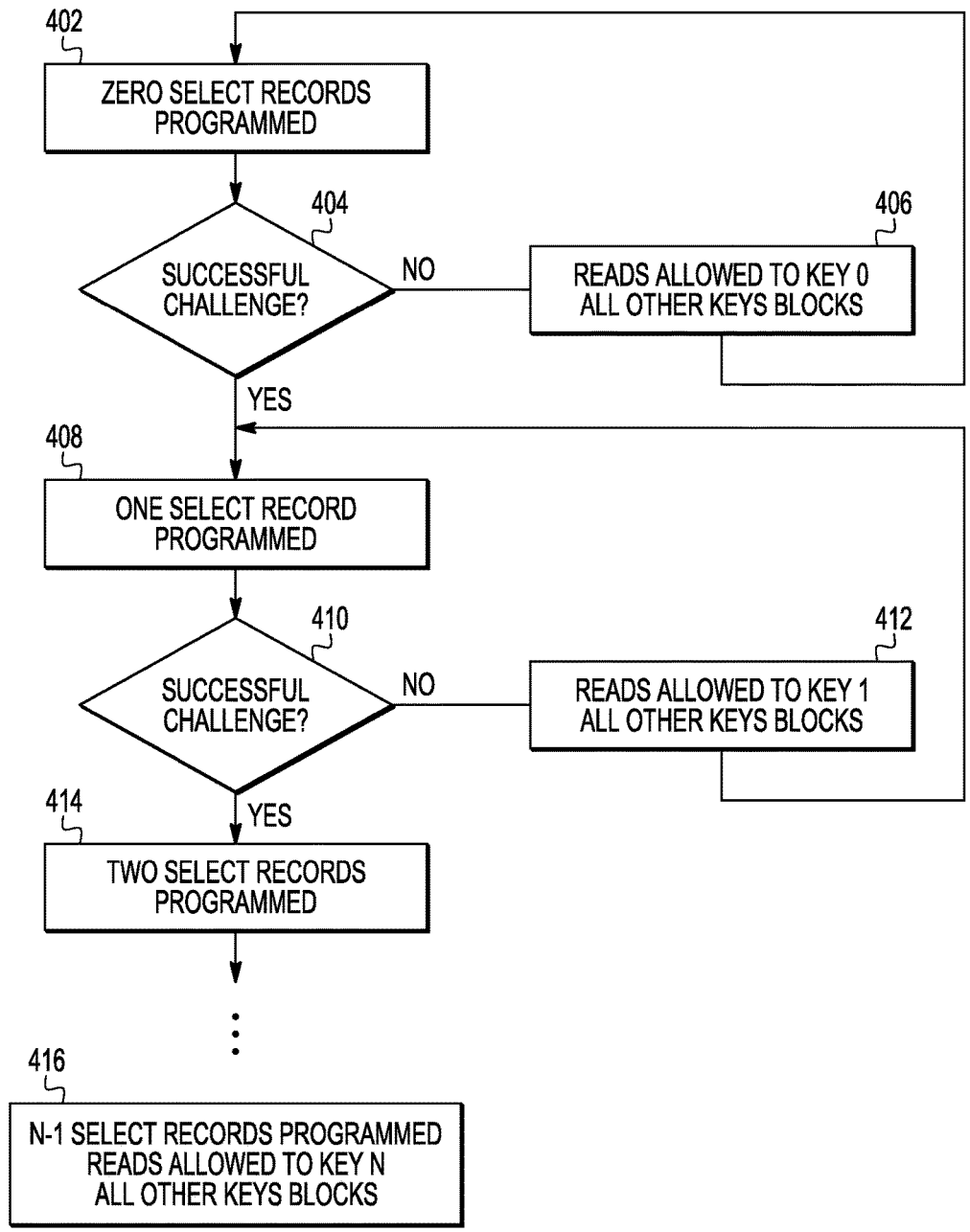
FIG. 4 illustrates information and control flows for the key controller of FIG. 2 consistent with at least one embodiment of the invention.

Referring to FIGS. 3 and 4, in at least one embodiment, key controller 216 and key selector circuit 302 may be configured to provide a current public key according to a non-trivial revocation technique that programs select records in response to a successful challenge of a received next public key by comparing it to a next public key stored in one-time programmable read-only memory 210 that is temporarily selected by key controller 216. For example, if zero select records are programmed (402), then public key 0 is provided to key register 212. The number of select records programmed determines an index for the public key currently being provided to key register 212 and a next public key temporarily selected by key controller 216. If no successful challenge occurs, then public key 0 is exposed and used for authentication of memory accesses and all other keys are blocked (406). If a successful challenge occurs (e.g., a comparison indicates that the received next public key equals the next public key stored in one-time programmable read-only memory 210 that is temporarily selected by key controller 216), then one select record is programmed (408) and public key 1 is provided to key register 212 and public key 0 is revoked (410). If no successful challenge occurs, then public key 1 remains exposed and all other keys are blocked (412). If a successful challenge occurs, a next select record is programmed (414), public key 2 is provided to key register 212, and public key 1 is revoked (412). The challenge and revocation continues as needed until n−1 records are programmed and reads are allowed to key n and accesses to all other keys are blocked. When no other public keys are available, service may be denied in response to a next challenge.

Figure 5:
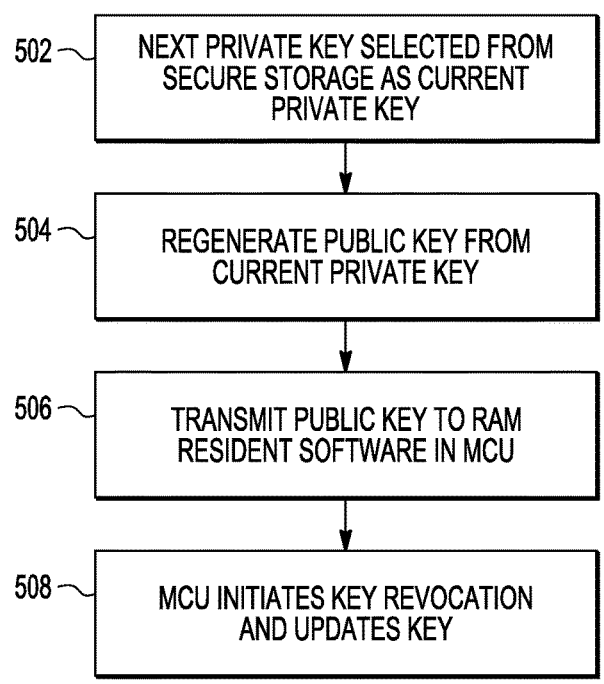
FIG. 5 illustrates information and control flows for a system of a manufacturer of the NVM system of FIG. 2 consistent with at least one embodiment of the invention.

FIGS. 2 and 5 illustrate exemplary response of a manufacturer to a compromised private key. In response to learning that a current private key has been compromised, the manufacturer replaces the current private key and current public key with a new private key. The manufacturer selects the next private key from secure storage (502) as the current private key and may regenerate the corresponding next public key from the current private key or otherwise obtain the corresponding public key (e.g., selected from a storage device) (504). The manufacturer may transmit the next public key and may also transmit new information for read/write memory portion 108 to microcontroller 140 (506). That transmission may use any suitable transmission interface (e.g., wireline or wireless communications interfaces and associated communications techniques). In response to receiving the new information and/or next public key, microcontroller 140 initiates a memory access and/or key revocation and update (508). Access controller 104 attempts to authenticate the access with the current public key. Since a new public key is being used by the memory access, the communication is not verified by access controller 104 with the current public key, and access controller handles the communication as a challenge handled by key module 208. Since the manufacturer has the correct next public key, key module 208 revokes the current public key, replaces it with the next public key stored in one-time programmable read-only memory 210 and, when applicable, updates the information stored in read/write memory 108, when applicable. Note that new information may not be transmitted, but the next public key may be used to authenticate the signature of any information that is transmitted. Transmission of new information may occur at any time after the current public key is revoked and replaced with the next public key. For example, to update the information after a successful challenge the microcontroller writes to memory controller control registers, the memory controller waits for status flags to be set in read/write memory portion 108, and writes to memory locations in read/write memory portion 108 using high voltages and many clock cycles.

Figure 6:
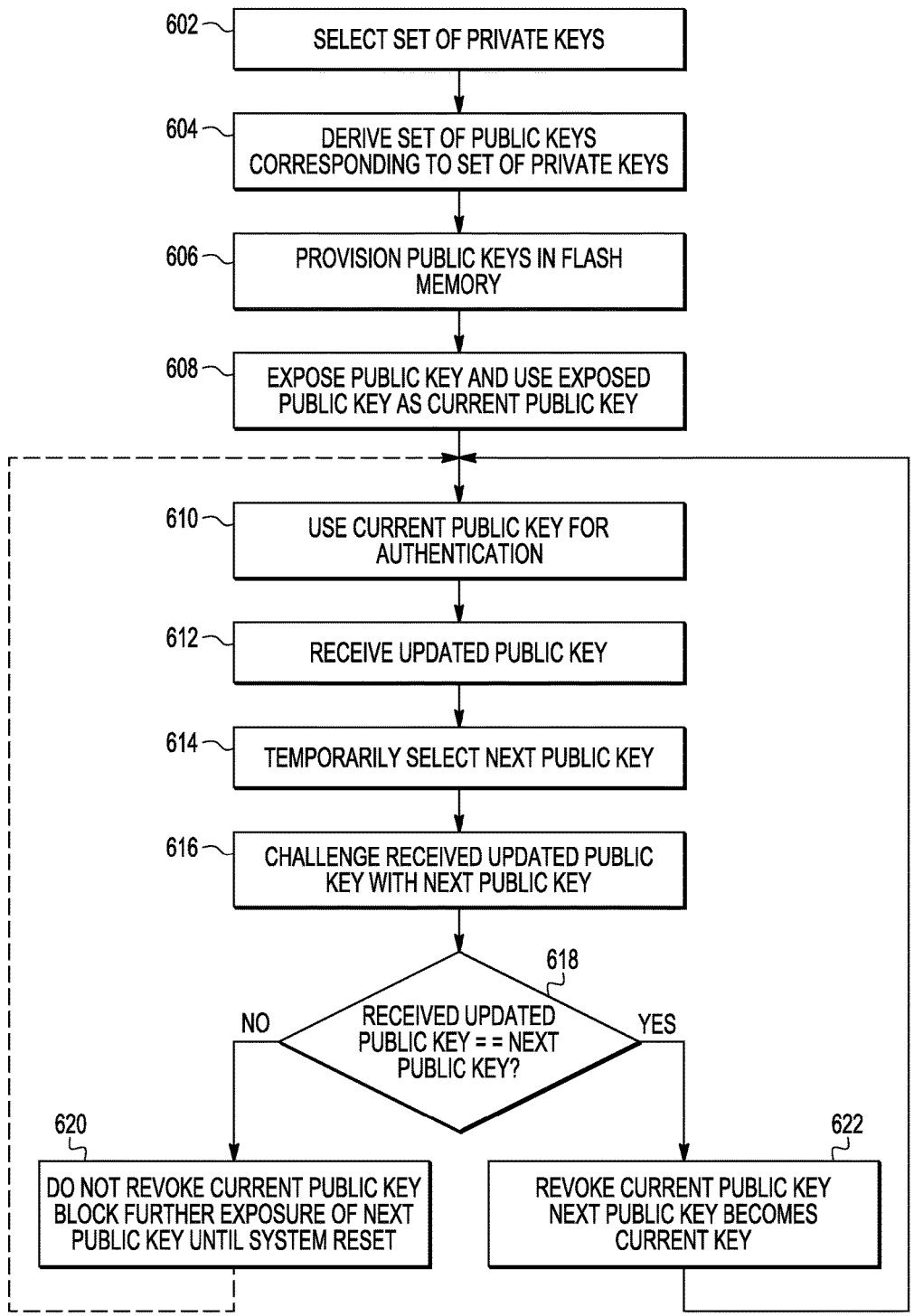
FIG. 6 illustrates information and control flows for provisioning and operation of the NVM system of FIG. 2 consistent with at least one embodiment of the invention.

FIGS. 2 and 6 illustrate an exemplary public key provisioning technique for NVM system 200 and operation of NVM system 200 in a target application. The manufacturer selects a set of private keys (602) and generates a set of corresponding public keys (604). The manufacturer securely stores the set of private keys and provisions one-time programmable read-only memory 210 with the public keys (606). The manufacturer configures the key controller to expose a first of the public keys to memory control circuitry 102 (608) and the system successfully challenges memory accesses and uses that first public key for authentication (610) until receiving an access providing an updated public key (612). For example, microcontroller 140 may store a next public key in memory in an encrypted form and software executing on microcontroller 14 decrypts the next public key and delivers it to the key controller with a memory access to revoke the current public key in response to an indication from the manufacturer to revoke a current public key. In response to receiving the updated public key, key controller temporarily selects a next public key (614) and challenges the received updated public key with the temporarily selected next public key (616). If the received updated public key is equal to the temporarily selected next public key, then the challenge is successful (618), and the key controller revokes the current key (e.g., key register 204 is updated with the selected next public key and/or a RAM resident value of the public key is destroyed, i.e., erased from authentication register 204 and/or a RAM in the microcontroller) and the next public key is permanently exposed to memory control circuitry 102 (e.g., by writing a corresponding select record and storing in key register 212) and becomes the current key (622). However, if the received updated public key is not equal to the temporarily selected next public key, then the challenge fails. The temporarily selected next public current key does not replace the current public key and the current public key is not revoked.

To reduce likelihood of success of a denial of service attack, embodiments of key module 208 will prevent handling another challenge until after a sufficient amount of time has elapsed (e.g., another write to revocation challenge register 214 is prevented until after expiration of a predetermined amount of time that would discourage such attacks) (620) and/or the manufacturing system may be notified that an unauthorized access occurred. For example, an indication of the attempt may be generated in microcontroller 140 and a reset of NVM system 200 and/or expiration of a predetermined amount of time may be required before handling a next attempt to challenge and revoke a current public key. The manufacturing system may then select a next private key, reset NVM system 200 and/or wait the predetermined amount of time, initiate a challenge that results in revoking the current key and the exposed next public key replaces the current key.

Thus, techniques for cryptographic key storage and revocation in a secure memory system have been described. In at least one embodiment, an apparatus includes a memory controller configured to provide information from a first storage structure in response to authentication of an access to the first storage structure. The authentication is based on a current first key of a plurality of first keys. The apparatus includes a second storage structure configured to store the plurality of first keys and a plurality of corresponding select records in corresponding one-time programmable storage elements. The apparatus includes a key controller configured to expose to the memory controller a first key of the plurality of first keys stored in the second storage structure in response to a select code based on the plurality of corresponding select records. The memory controller is configured to use the first key as the current first key. Only one of the plurality of first keys stored in the second storage structure may be exposed to the memory controller at a time. Other first keys of the plurality of first keys stored in the second storage structure may be inaccessible to the memory controller from the second storage structure. The apparatus may include a revocation challenge storage element configured to store an updated first key received from a source external to the apparatus. The apparatus may include a first key storage element configured to store the first key exposed by the key controller as the current first key, the authentication storage element being readable by the memory controller. The key controller may be configured to update the first key storage element with a next first key of the plurality of first keys. The next first key of the plurality of first keys may be exposed in response to a successful challenge of the updated first key. The key controller may select the next first key from the plurality of first keys in monotonic sequence. The key controller may compare contents of the revocation challenge storage element with the next first key to determine whether to revoke the current first key and provide the next first key as the current first key. Each first key of the plurality of first keys may be mathematically linked to a corresponding second key of a plurality of second keys. The next first key may be based on a corresponding next second key of the plurality of second keys. The first key may be a public key and the second key may be a private key of an asymmetric key encryption. The key controller may be configured to require expiration of a predetermined amount of time before handling another write to the revocation challenge storage element in response to contents of the revocation challenge storage element differing from the next first key. The first storage structure may be non-volatile memory and the revocation challenge storage element may be a write-only storage element to the memory controller. The current first key storage element may be a read-only storage element to the memory controller.

In at least one embodiment, a method includes providing access to first storage structure in response to authentication of a memory request to the first storage structure, the authentication being based on a current first key of a plurality of first keys stored in a second storage structure. The method includes exposing a first key of a plurality of first keys as the current first key in response to a select code based on a plurality of corresponding select records stored in one-time programmable storage elements of the second memory structure. Only one of the plurality of first keys stored in the second storage structure may be exposed at a time. Other first keys of the plurality of first keys stored in the second storage structure may be inaccessible from the second storage structure at the time. The method may include updating a select record of the plurality of select records, thereby exposing to the memory access controller a next first key of the plurality of first keys stored in the second memory structure, in response to a successful challenge of a received updated first key. The method may include revoking the current first key in response to a successful challenge of the received updated first key with the next first key and providing the next first key as the current first key. The method may include preventing additional challenges of an additional received updated first key with an additional next exposed first key from the plurality of first keys until expiration of a predetermined length of time in response to an unsuccessful challenge of the received updated first key with the next first key. Each first key of the plurality of first keys may be mathematically linked to a corresponding second key of a plurality of second keys. The next first key may be based on a corresponding next second key of the plurality of second keys. The plurality of first keys may be exposed as the first key in monotonic sequence.

In at least one embodiment, a method for providing access to a first storage structure of a system includes controlling access to a first storage structure using a current first key of a plurality of first keys stored in a second storage structure. The method includes exposing a next first key of the plurality of first keys as the current first key in response to a successful challenge of a received updated first key with the next first key and preventing exposure of the next first key from the plurality of first keys until expiration of a predetermined period of time in response to an unsuccessful challenge of the received updated first key with the next first key. Only one of the plurality of first keys stored in the second storage structure may be exposed at a time and other first keys of the plurality of first keys stored in the second storage structure may be inaccessible from the second storage structure.

The techniques described above allow revocation and replacement of an asymmetric cryptographic key according to a predetermined set of private keys and corresponding public keys without recalling the product from the target application. Although the invention is described herein with reference to specific embodiments, various modifications and changes can be made without departing from the scope of the present invention as set forth in the claims below. For example, although the techniques are described herein with reference to specific embodiments that encrypt and/or generate a digital signature for write access to a memory with a private key and decrypt and/or provide read access to a memory with a public key, the techniques may be adapted to apply to systems encrypting with public key and decrypting with private key. In addition, although described in the context of secure access to a non-volatile memory system, techniques described herein may be used in various other information security applications (e.g., Internet Key Exchange protocol, Secure Socket Layer or IETF standard Transport Layer Security, Internet Key Exchange, or other protocols using asymmetric key algorithms) Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus comprising:
    a memory controller configured to provide information from a first storage structure in response to authentication of an access to the first storage structure, the authentication of the access to the first storage structure being based on a current first key of a plurality of first keys;
    a second storage structure configured to store the plurality of first keys and a plurality of corresponding select records, wherein the second storage structure comprises one-time programmable storage elements configured to store the plurality of first keys and the plurality of corresponding select records;
    a key controller configured to expose, to the memory controller, a first key of the plurality of first keys stored in the second storage structure, in response to a select code generated from one or more programmed select records of the plurality of corresponding select records, the memory controller being configured to use the first key as the current first key; and
    a revocation challenge storage element, communicatively coupled to the key controller, and configured to store an updated first key received from a source external to the apparatus and to provide the updated first key to the key controller, wherein
        the key controller is configured to compare the updated first key with the first key,
        if the updated first key matches the first key, then the key controller is configured to
            store the first key as the current first key, and
            program a previously unprogrammed select record of the plurality of corresponding select records for use in a subsequent generation of the select code.

2. The apparatus, as recited in claim 1, wherein only one of the plurality of first keys stored in the second storage structure is exposed to the memory controller at a time and other first keys of the plurality of first keys stored in the second storage structure are inaccessible to the memory controller from the second storage structure.

3. The apparatus, as recited in claim 1, further comprising:
    a first key storage element configured to store the first key exposed by the key controller as the current first key, the first key storage element being readable by the memory controller.

4. The apparatus, as recited in claim 1, wherein the key controller is configured to update the first key storage element with a next first key of the plurality of first keys in response to a successful challenge of the updated first key.

5. The apparatus, as recited in claim 4, wherein the key controller selects the next first key from the plurality of first keys in monotonic sequence.

6. The apparatus, as recited in claim 4, wherein the key controller compares contents of the revocation challenge storage element with the next first key to determine whether to revoke the current first key and provide the next first key as the current first key.

7. The apparatus, as recited in claim 4,
wherein each first key of the plurality of first keys is mathematically linked to a corresponding second key of a plurality of second keys, and
wherein the next first key is based on a corresponding next second key of the plurality of second keys.

8. The apparatus, as recited in claim 7, wherein the first key is a public key and the second key is a private key of an asymmetric key encryption.

9. The apparatus, as recited in claim 4, wherein the key controller is configured to require expiration of a predetermined amount of time before handling another write to the revocation challenge storage element in response to contents of the revocation challenge storage element differing from the next first key.

10. The apparatus, as recited in claim 1, wherein the first storage structure is non-volatile memory and the revocation challenge storage element is a write-only storage element to the memory controller and the current first key storage element is a read-only storage element to the memory controller.

11. A method comprising:
providing access to a first storage structure in response to authentication of a memory request to the first storage structure, the authentication of the memory request for access to the first storage structure being based on a current first key of a plurality of first keys stored in a second storage structure; and
exposing a first key of a plurality of first keys as the current first key in response to a select code generated from a plurality of corresponding select records stored in one-time programmable storage elements of the second memory structure, wherein the one-time-programmable storage elements of the second memory structure are configured to store the plurality of first keys and the plurality of corresponding select records;
receiving an updated first key from an external source;
selecting a next first key of the plurality of first keys stored in the second memory structure using a temporary select code, wherein the temporary select code is generated using the plurality of the corresponding select records and at least one additional select record of the corresponding select records;
comparing the updated first key with the selected next first key to determine whether the updated first key and the selected next first key match; and
updating the at least one additional select record of the plurality of select records, thereby exposing the selected next first key, in response to a match of the updated first key and the selected next first key.

12. The method, as recited in claim 11, wherein only one of the plurality of first keys stored in the second storage structure is exposed at a time and other first keys of the plurality of first keys stored in the second storage structure are inaccessible from the second storage structure at the time.

13. The method, as recited in claim 11, further comprising:
revoking the current first key in response to the successful challenge of the received updated first key with the next first key and providing the next first key as the current first key.

14. The method, as recited in claim 11, further comprising: preventing additional challenges of an additional received updated first key with an additional next exposed first key from the plurality of first keys until expiration of a predetermined length of time in response to an unsuccessful challenge of the received updated first key with the next first key.

15. The method, as recited in claim 11, wherein each first key of the plurality of first keys is mathematically linked to a corresponding second key of a plurality of second keys, wherein the next first key is based on a corresponding next second key of the plurality of second keys, wherein the plurality of first keys are exposed as the first key in monotonic sequence.

\* \* \* \* \*